(12) United States Patent
Muyzert et al.

(10) Patent No.: US 7,408,836 B2
(45) Date of Patent: Aug. 5, 2008

(54) METHOD OF AND APPARATUS FOR PROCESSING SEISMIC DATA IN THE PRESENCE OF ANISOTROPY

(75) Inventors: Everhard Johan Muyzert, Girton (GB); Jan Henrik Kommedal, Stavanger (NO)

(73) Assignee: Westerngeco L.L.C., Houston, TX (US)

( * ) Notice: Subject to any disclaimer, the term of this patent is extended or adjusted under 35 U.S.C. 154(b) by 0 days.

(21) Appl. No.: 10/498,173

(22) PCT Filed: Dec. 19, 2002

(86) PCT No.: PCT/GB02/05820

§ 371 (c)(1),
(2), (4) Date: Sep. 29, 2004

(87) PCT Pub. No.: WO03/056363

PCT Pub. Date: Jul. 10, 2003

(65) Prior Publication Data

US 2005/0068850 A1 Mar. 31, 2005

(30) Foreign Application Priority Data

Dec. 22, 2001 (GB) .................................. 0130873.3

(51) Int. Cl.
*G01V 1/28* (2006.01)
(52) U.S. Cl. .............................. 367/54; 367/38; 367/75; 702/18
(58) Field of Classification Search .................. 367/15, 367/21, 38, 54, 75, 36, 50; 702/17, 18
See application file for complete search history.

(56) References Cited

U.S. PATENT DOCUMENTS

| | | | |
|---|---|---|---|
| 4,817,061 A | 3/1989 | Alford et al. | |
| 5,331,604 A * | 7/1994 | Chang et al. | 367/31 |
| 5,579,282 A | 11/1996 | Barr | |
| 5,587,968 A | 12/1996 | Barr | |
| 5,922,961 A * | 7/1999 | Hsu et al. | 73/606 |
| 6,446,008 B1 * | 9/2002 | Ozbek | 702/17 |
| 6,556,921 B1 * | 4/2003 | Hardage et al. | 702/14 |
| 2003/0018435 A1 * | 1/2003 | Jenner et al. | 702/14 |

FOREIGN PATENT DOCUMENTS

GB 2 304 897 A 3/1997

(Continued)

OTHER PUBLICATIONS

Debayle, et al. "Anisotropy in the Australian upper rmantle from Love and Rayleigh waveform inversion." Earth and Planetary Science Letters 184 (2000).*

(Continued)

*Primary Examiner*—Jack W Keith
*Assistant Examiner*—Scott A Hughes
(74) *Attorney, Agent, or Firm*—Steven Gahlings, Esq.; James McAleenan, Esq.; Jody Lynn DeStefanis, Esq.

(57) ABSTRACT

A method of and apparatus for processing seismic data. A method of processing seismic data comprising the steps acquiring seismic data in at least two shots that have different source-receiver azimuths from one another, and selecting events arising from interface seismic waves in each shot. The interface wave events are processed to provide information about azimuthal dependence of the velocity of seismic energy in the near-surface of the earth's interior. The invention may be used to process events arising from Scholte waves in marine seismic data, or to processing events arising from Love waves or Rayleigh waves in land seismic data. The method may be applied to seismic data acquired specifically to provide information about the near-surface or to seismic data acquired to provide information about the underlying geological structure.

23 Claims, 8 Drawing Sheets

Circle shoot survey design for azimuthal coverage with the receiver array (triangles) in the centre and the shots (stars) located on two circle segments

FOREIGN PATENT DOCUMENTS

| | | |
|---|---|---|
| WO | 01/94982 A2 | 12/2001 |
| WO | 01/94982 A3 | 4/2002 |

OTHER PUBLICATIONS

McDuff, Russell. "Structure of the Oceanic Lithosphere, Plate Tectonics, and Seafloor Spreading, Seafloor Topography." Oceanography 540—MaZRine Geological Processes—WInter Quarter 2001.*

Bale et al Analysis and stacking of 3-D converted wave data in the presence of azimuthal anisotropy SEG expanded abstracts of 70$^{th}$ annual meeting, 2000, XP-002237227.

Bloxsom Lynn Field measurements of azimuthal anisotropy: first 60 meters, San Francisco Bay area, CA, and estimation of the horizontal stresses' ratio from $V_{s1}/V_{s2}$ Geophysics, vol. 56, No. 6, 1991, XP-002237226, pp. 822-832.

Dong et al 3-D viscoelastic anisotropic modeling of data from a multicomponent, multiazimuth seismic experiment in northeast Texas Geophysics, vol. 60, No. 4, 1995, pp. 1128-1138.

Iranpour et al Local velocity analysis by parametric wavenumber estimation in seismic (*fk*-Music) Eage 64$^{th}$ Conference and Exhibition, Florence, Italy, May 27-30, 2002, p. 171.

Jensen et al Shear properties of ocean sediments determined from numerical modeling or Scholte wave data Ocean seismo-acoustics: low frequency underwater acoustics, Rome, Italy, Marine Science, Plenum Press, New York, USA, 1986 XP-002237642, pp. 683-692.

Krim et al Two decades of array signal processing research IEEE Signal Processing Magazine, Jul. 1996, pp. 67-94.

Levshin et al Evaluation of uncertainties and bias in surface wave tomographic maps and travel time correction surfaces Proceedings of the 21$^{st}$ Seismic Research Symposium on Monitoring a CTBT, 1999, XP-002237222.

Mari Estimation of static corrections for shear-wave profiling using the dispersion properties of Love waves Geophysics, vol. 49, No. 8, 1984, pp. 1169-1179.

Montagner et al Global anisotropy in the upper mantle inferred from the regionalization of phase velocities Journal of Geophysical Research, vol. 95, No. B4, 1990, pp. 4797-4819.

Muyzert Scholte wave velocity inversion for a near surface S-velocity model and PS-statics SEG expanded abstracts of 70$^{th}$ annual meeting, 2000, XP-002237224.

Nakanishi Surface wave tomography: velocity and Q Seismic tomography: theory and practice, edited by H.M Iyer and K. Hirahara, Chapman and Hall, London, 1993, chapter 5, pp. 92-132.

Norris et al The speed of a wave along a fluid/solid interface in the presence of anisotropy and prestress Journal of the Acoustical Society of America, vol. 98, No. 2, part 1 1995, pp. 1147-1154.

Sinha et al Stress-induced azimuthal anisotropy in borehole flexural waves Geophysics, vol. 61, No. 6, 1996, pp. 1899-1907.

Smith et al The azimuthal dependence of Love and Rayleigh wave progagation in a slightly anisotropic medium Journal of Geophysical Research, vol. 78, No. 17, 1973, XP008015796, pp. 3321-3333.

Stoll et al Measuring lateral variability of sediment geoacoustic properties Journal of the Acoustical Society of America, vol. 96, 1994, pp. 427-438.

* cited by examiner

Circle shoot survey design for azimuthal coverage with the receiver array (triangles) in the centre and the shots (stars) located on two circle segments Circle shoot survey design that fills in the gaps in the azimuthal coverage of the survey design shown in fig 2. The receiver array is indicated by triangles, the shots are indicated by stars and are located on two circle segments Cross-spread survey design for azimuthal dependant phase-velocity measurements recorded by a receiver array (triangles). The shots are located on lines S1 and S3

Cross-spread shot pattern for azimuthal dependant phase-velocity measurements within a source array ( black stars ).The receivers ( triangles ) are located on lines R1 and R3

Flow chart showing the processing sequence

METHOD OF AND APPARATUS FOR PROCESSING SEISMIC DATA IN THE PRESENCE OF ANISOTROPY

The present invention relates to a method of or an apparatus for processing seismic data, and in particular relates to a method of or an apparatus for processing seismic data acquired at a survey location where the earth's interior at or near the earth's surface has different seismic properties to the underlying layer(s) of the earth's interior so as to obtain information about the properties of the near-surface region of the earth's interior. The invention also relates to a method of seismic surveying that includes processing acquired seismic data in the above way. The invention may be applied to processing seismic data acquired in a marine seismic survey, to processing seismic data acquired in a land seismic survey (including data acquired in a permafrost region), or to processing seismic data acquired in a borehole seismic survey.

FIG. 1 is a schematic view of one seismic surveying arrangement. This figure shows a marine surveying arrangement in which seismic energy is emitted by a seismic source 1 that is suspended from a towing vessel 2 beneath the surface of a water column 7, such as the sea or a lake. When seismic energy that has been emitted downwards reaches the sea-bed, some of the energy will pass into the earth's interior and propagate downwards through the earth's interior until it is reflected by a geological feature that acts as a reflector 3. The reflected seismic energy passes upwards through the earth's interior, and is detected by an array of seismic receivers 4 disposed on the sea-bed. Information about the earth's interior is obtained, for instance, by determining the travel time of seismic energy from the seismic source 1 to the receivers 4. Only one reflector 3 is shown in FIG. 1 but, in practice, a number of geological features within the earth's interior will act as partial reflectors for seismic energy. Moreover, only one source 1 is shown in FIG. 1 but in practice a marine seismic surveying arrangement may have an array of sources.

The geological structure of the earth is not uniform. One problem encountered in processing marine seismic data is that the seismic properties of the earth in a region 5 at or near the earth's surface (hereinafter referred to as the "near-surface") are frequently significantly different from the properties of the underlying geological structure 6 (hereinafter referred to as the "basement"). This can occur if, for example, the near-surface 5 is less consolidated than the basement. In particular, the velocity of seismic energy may be significantly lower in the near-surface 5 than in the basement 6, and the near-surface is therefore sometimes alternatively referred to as a "low velocity layer" (LVL). This difference in velocity will produce a shift in the travel time of seismic energy compared to the travel time that would be recorded if the near-surface and the basement had identical seismic properties, and these shifts in travel time are generally known as "static shifts", or just "statics".

The near surface 5 is shown at the surface of the earth's interior in FIG. 1, but it need not extend to the sea-bed and there could be a further layer overlying the near-surface. The boundary between the near-surface and the basement may not be distinct, and the earth's properties may change gradually over a finite depth range.

The static shift generated by the near-surface 5 depends on the thickness of the near-surface, and on the velocity of propagation of seismic energy through the near-surface. Lateral variations usually occur in both the thickness of the near-surface 5 and the propagation velocity through the near-surface, so that the static shift observed at a seismic receiver at one location is likely to be different from the static shift observed at a receiver at another location. To a first approximation, the entire data set recorded at one receiver will be advanced or delayed by a static time shift relative to data recorded at another receiver.

It is highly desirable to take account of the static shift when processing seismic data Unless these static shifts are removed from the seismic data, ambiguity will exist as to whether variations in arrival times of seismic events from deeper layers are due to variations in the depth or lateral locations of those deeper layers, or simply arise owing to propagation effects in the near-surface 5.

The downwardly propagating seismic energy incident on the sea-bed will contain p-waves (pressure waves). As the p-waves propagate through the earth's interior it is possible for partial mode conversion to an s-wave (shear wave) to occur. In FIG. 1, partial mode conversion is shown occurring when the seismic energy undergoes reflection at a target reflector 3 disposed under the near-surface. (The reflection itself is only a partial reflection, since some seismic energy will be transmitted through the target reflector without reflection.) As a result the upwardly propagating seismic energy produced upon reflection at the target reflector 3 includes both an upwardly propagating p-wave (shown as a solid line) and an upwardly propagating s-wave (shown as a broken line).

A wave that undergoes mode conversion from a pressure wave to a shear wave at some point between the source and receiver is generally known as a "ps-wave". The static for a ps-wave can be split into a source-side static for the down-going p-wave, and a receiver-side static for the upgoing s-wave.

A further problem in analysing the seismic data is that the seismic properties of the near-surface 5 may be azimuthally anisotropic. In this case, an up-going s-wave is split as it passes through the near-surface 5 to give a fast s-wave and a slow s-wave which have different velocities and particle motions from one another. In the presence of azimuthal anisotropy the seismic data acquired at the receiver 4 will thus include a pair of ps-events. The fast s-wave and the slow s-wave have different polarisation states. Furthermore, the anisotropy of the seismic properties of the near-surface 5 means that the fast s-wave will have a different static to the slow s-wave.

R Bale et al have described, in "Analysis and stacking of 3-D converted waves data in the presence of azimuthal anisotropy" SEG Expanded Abstracts of $70^{th}$ Annual Meeting (2000), a method of making polarisation measurements on ps-seismic events. After the polarisation angle, which is the azimuth of the fast s-wave, has been determined the seismic data may be rotated into the fast and slow s-wave directions.

A first aspect of the present invention provides a method of processing seismic data, the method comprising the steps of: selecting events arising from interface seismic waves in at least two shots, the two shots having different source-receiver azimuths from one another; and processing the selected events thereby to determine information about azimuthal dependence of the velocity of seismic energy in the near-surface of the earth's interior.

The present invention is thus able to provide information about the near-surface from the seismic data. No additional knowledge of the geological properties of the survey location is required. In particular, the invention can provide information about the local phase velocity at a point in the near-surface located generally below a receiver.

The seismic data may be marine seismic data and the selected events may be events arising from Scholte waves.

A second aspect of the invention provides a method of seismic surveying comprising the steps of: acquiring first seismic data at a survey location; and processing the first seismic data according a method as defined above thereby to obtain information about the properties of the near-surface at the survey location.

The method may further comprise processing the first seismic data to obtain information about at least one underlying layer. Thus, it is possible to obtain data relating to the basement and data relating to the near-surface in a single survey.

Alternatively, the method may further comprise the steps of: acquiring second seismic data at the survey location; and processing the second seismic data to obtain information about at least one underlying layer at the survey location. This allows the first seismic data to be acquired specifically to provide information about the near-surface and allows the second seismic data to be acquired specifically to provide information about the basement.

A third aspect of the present invention provides an apparatus for processing seismic data, the apparatus comprising:
means for selecting events arising from interface seismic waves in at least two shots, the two shots having different source-receiver azimuths from one another; and
means for processing the selected events thereby to determine information about azimuthal dependence of the phase velocity of seismic energy in the near-surface of the earth's interior.

The apparatus may comprise a programmable data processor.

A fourth aspect of the invention provides a storage medium containing a program for a data processor of an apparatus as defined above.

Preferred embodiments of the present invention will now be described by way of illustrative example with reference to the accompanying Figures in which.

Figure 7:
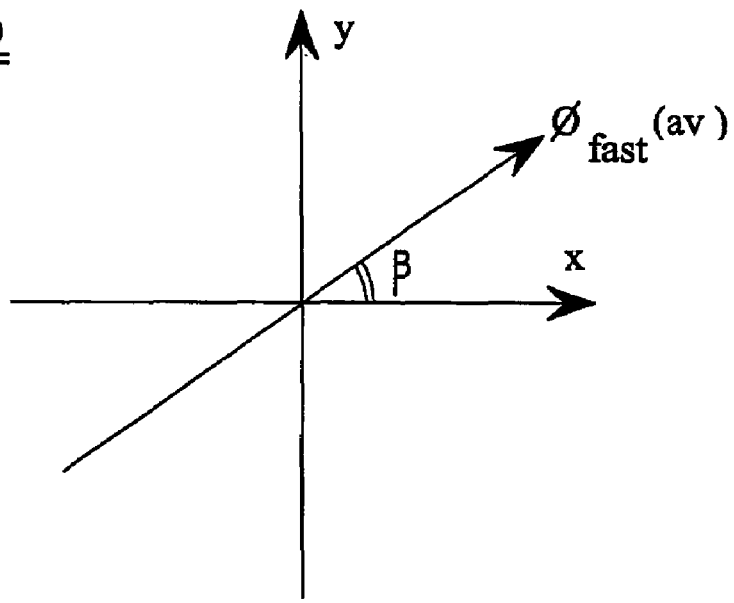
Figure 7:
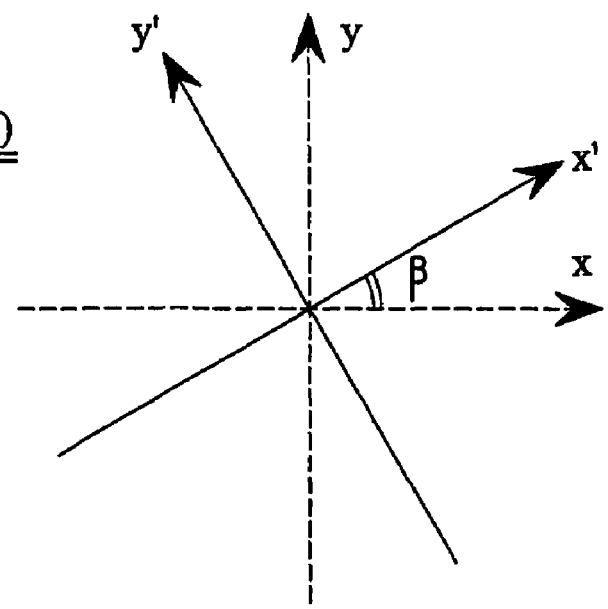
Figure 8:
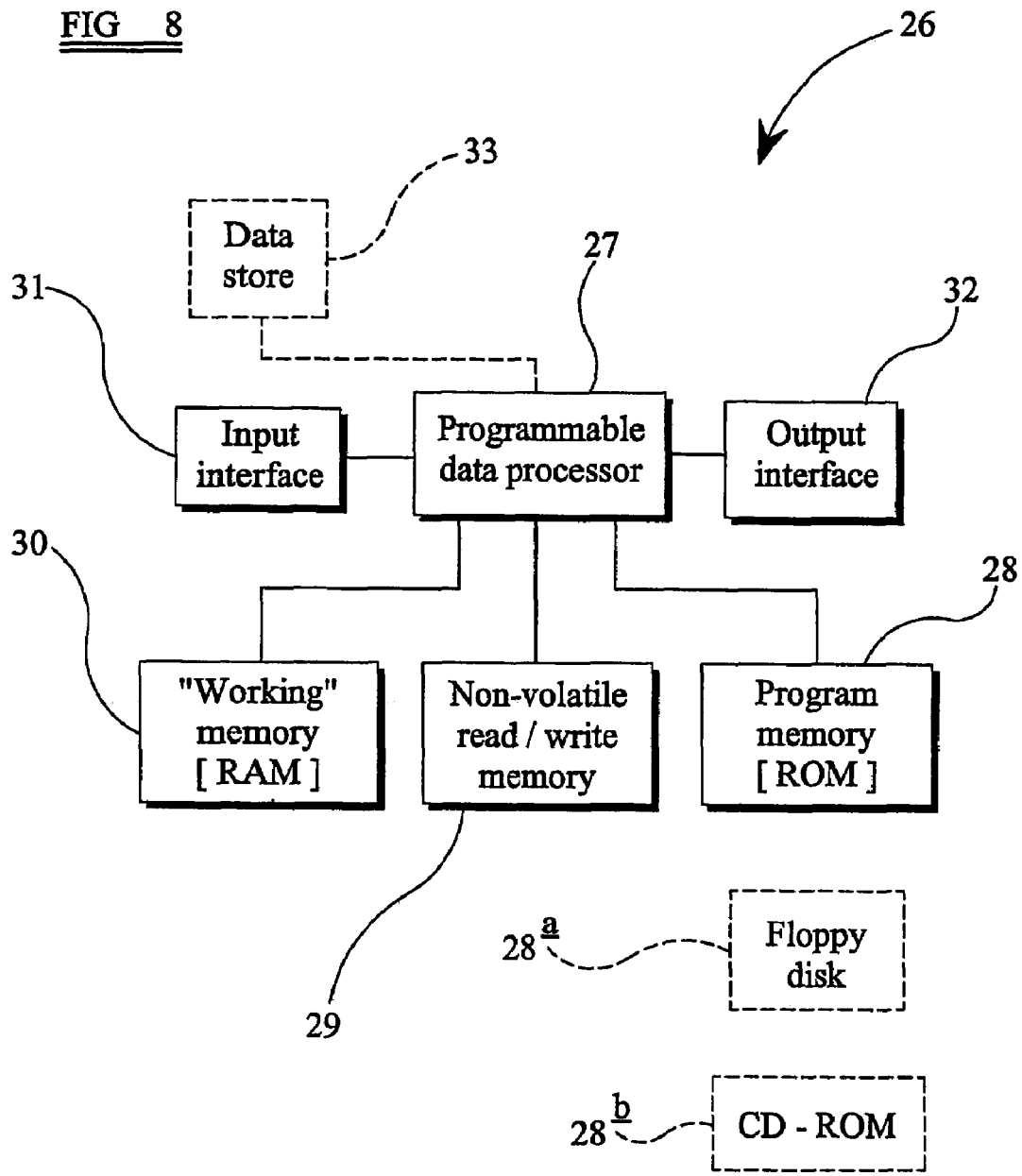

FIGS. 7(a) and 7(b) are schematic illustrations of processing seismic data using information about seismic properties obtained by the present invention; and FIG. 8 is a block schematic diagram of an apparatus according to the invention.

The present invention makes use of surface waves or interface waves to obtain information about the seismic properties of the near surface of the earth's interior.

Interface waves are waves that travel in a defined mode along an interface at which a velocity contrast exists. One example of an interface wave is a Scholte wave, which travels along a fluid-solid interface, such as the interface between the sea and the sea-bed. A Scholte wave is dispersive, so that its phase-velocity and its group-velocity each vary with frequency and with the mode of the wave. As described by R. D. Stoll et al, in "Measuring Lateral Variability of Sediment Geoaccoustic Properties", J. Acoust. Soc. Am. Vol. 96, pp 427-438 (1994), a Scholte wave can be excited by a source such as an explosive or a shear-wave source disposed at or in the sea-bed. A seismic source, such as an air gun, disposed within the water layer can also excite Scholte waves as a result of the conversion of seismic energy at the fluid-solid interface. Thus, in the seismic surveying arrangement shown in FIG. 1 a Scholte wave may be generated in the region 8 where seismic energy propagating downwards from the source is incident on the sea-bed. A Scholte wave generated by conversion of seismic energy at the region 8 will then propagate through the sea-bed, close to the interface between the sea-bed and the water layer. That is, the Scholte wave propagates through the near surface of the earth's interior.

The velocity of a Scholte wave depends mainly on the s-wave velocity of the near surface 5, and also on other properties of the near surface such as its p-wave velocity and its density. Variations in the s-wave velocity of the near surface 5 thus lead to variations in the phase-velocity of a Scholte wave propagating through the near surface. Thus, if the Scholte wave phase-velocity can be determined, it can be inverted to obtain information about natural variations of the s-wave velocity of the near surface.

As described by M. L. Smith et al in "The Azimuthal Dependency of Love and Rayleigh Wave Propagation In Slightly Anisotropic Medium", J. Geophys. Res. Vol. 78, pp 3321-3333 (1973), the azimuthal variation of the velocity of an interface wave in the presence of slight azimuthal anisotropy can be described by the following equation:

$$V(\omega,\phi) - V_0(\omega, \phi) = A_0(\omega) A_1(\omega)\cos(2\phi) + A_2(\omega)\sin(4\phi) \quad (1)$$

In equation (1), $V(\omega,\phi)$ is the phase-velocity of the interface wave at a frequency $\omega$ and an azimuth $\phi$, $V_0(\omega,\phi)$ is the reference phase-velocity of the interface wave as calculated for a standard model, $A_0(\omega)$ is the isotropic component of the difference between the actual phase velocity and the value of the phase velocity given by the standard model, and $A_1$ to $A_4$ are frequency-dependent quantities that describe the azimuthal dependence of the difference between the actual phase velocity and the value of the phase velocity given by the standard model.

The azimuthal direction of the surface wave is given by:

$$\varphi_{fast} = \arctan\left(\frac{A_2}{A_1}\right) \quad (2)$$

Figure 1:
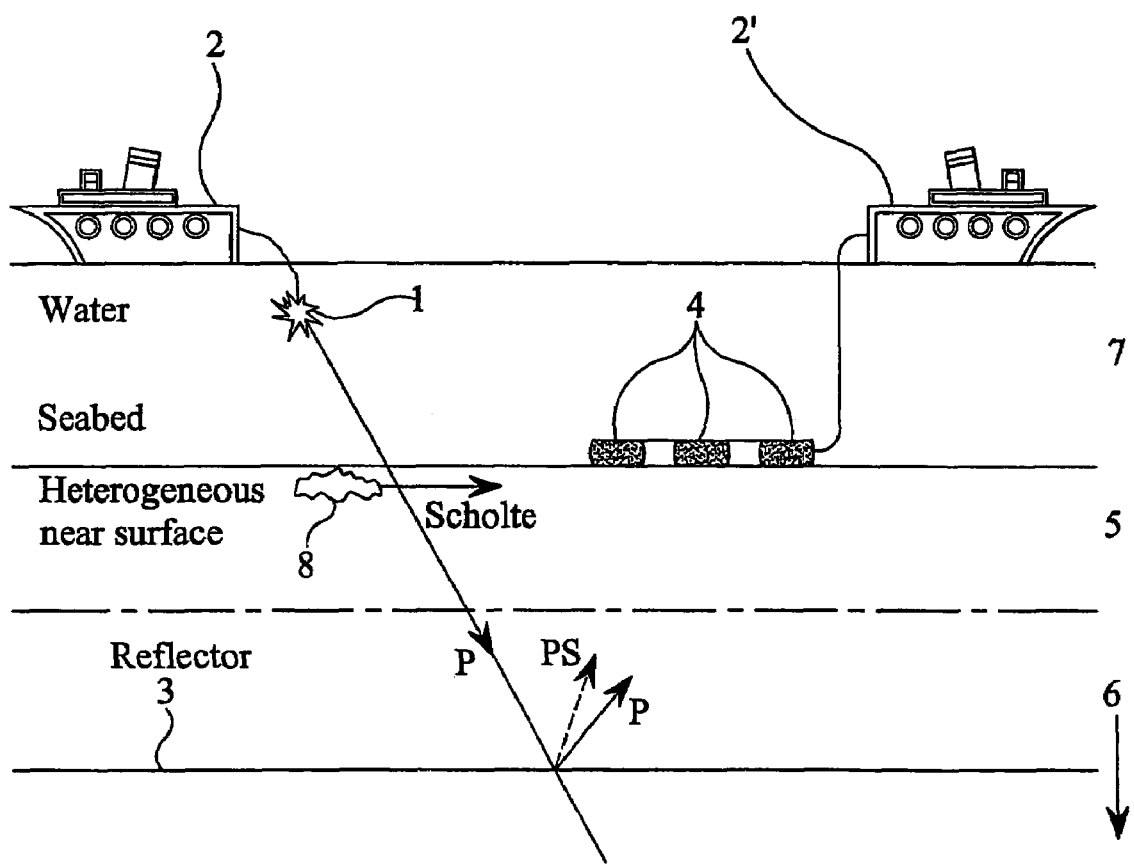
FIG. 1 is a schematic illustration of a marine seismic survey.

FIG. 1 illustrates the invention as applied to a typical sea-bed seismic survey. A seismic source 1 is towed through the water layer by a towing vessel 2. Although only one source is indicated in FIG. 1, in practice an array of separate seismic sources, such as an array of airguns is generally used. Alternatively, seismic sources such as explosives or shear-wave sources, disposed on the sea-bed may be used.

An array of seismic receivers 4 is disposed on the sea-bed. The receiver array may conveniently be embodied as an ocean bottom cable deployed on the sea-bed by another survey vessel 2' but, in principle, the seismic receivers 4 could be deployed individually on the sea-bed. Each seismic receiver may be a single-component seismic receiver, that records only a single component of the seismic wave-field at the receiver. Each seismic receiver 4 may alternatively be a multi-component seismic receiver that can record more than one component of the received wave-field. In particular, each seismic receiver 4 may include a three-component geophone for recording three orthogonal components of the particle motion (the term "particle motion" includes particle displacement, particle velocity, particle acceleration, and higher derivatives of the particle velocity), and may possibly also include a hydrophone for recording the water pressure at the sea-bed (which is a scalar quantity).

In principle the invention may be applied to determining the static shift of the near-surface from a fill seismic survey—that is, from a seismic survey that is intended to provide information about the basement 6. However, a seismic survey intended to provide good quality data relating to the basement 6 may not always provide good quality data relating to the near-surface 5. Therefore, a separate survey to determine the static shift of the near surface can be carried out before or after a full seismic survey is carried, since this might allow the static shift to be determined more accurately than if the static shift is determined from the full survey. The present invention can be applied to seismic data acquired in a full seismic survey, or to seismic data acquired in a seismic survey carried out specifically to provide information about the static shift of the near surface.

Scholte waves may be generated in the seismic survey of FIG. 1, as a result of conversion of energy at the fluid-solid interface (i.e. at the interface between the water layer and the near surface 5). It is assumed that the Scholte waves are generated in the region 8 generally below the source array 1.

When the seismic source array 1 is actuated, the seismic data acquired at each of the receivers 4 will contain events relating to at least the following:

(a) seismic energy that has travelled direct from the source array 1 to the receiver 4 through the water column (the "direct wave", not shown in FIG. 1);

(b) p-wave arrivals that have undergone reflection at the reflector 3 below the near surface 5;

(c) s-wave arrivals arising from reflection and partial mode conversion at the reflector 3 below the near surface 5;

(d) interface waves such as Scholte waves; and (e) events arising from reflection, and possible mode conversion, at other reflectors located within the basement 6 (the method of the invention does not make use of these events, but they will generally be present in the seismic data).

It should be noted that the amplitude of Scholte waves depends primarily on the distance between the seismic source and the sea-bed. In shallow water, seismic data acquired at the receivers is likely to contain adequate Scholte wave data, but in deep water the Scholte wave events may have a low signal to noise ratio. If the seismic data acquired at the receivers 4 does not contain Scholte wave data having a good signal to noise ratio, it may be necessary to carry out the additional survey described above. The additional survey can be specifically focused on the excitation and recording of Scholte waves in order to ensure reliable results.

Once the seismic data has been acquired, it is initially necessary to select one component of the seismic data for the purpose of determining the phase-velocity of seismic energy in the near-surface 5. In a full 4-C survey, data relating to the vertical component and to orthogonal horizontal components of the particle motion at the receiver, and data relating to the pressure in the water column will be available. It is generally preferable to select the vertical component of the particle motion for further analysis, although data relating to the pressure in the water column may alternatively be selected.

The horizontal components of the particle motion can suffer from geophone coupling problems, which give rise to possible phase and amplitude variations within the receiver array. If the horizontal components of the particle motion are selected it is preferred, although not essential, to rotate the co-ordinates towards the azimuth φ of the source. This may be done using:

$$\begin{bmatrix} V_{x\varphi} \\ V_{y\varphi} \end{bmatrix} = \begin{bmatrix} \cos\varphi & \sin\varphi \\ -\sin\varphi & \cos\varphi \end{bmatrix} \begin{bmatrix} V_x \\ V_y \end{bmatrix} \qquad (3)$$

where $V_x$ and $V_y$ are the measured x- and y-components of the particle motion, and $V_{x\varphi}$ and $V_{y\varphi}$ are the components after rotation by φ.

The number of receivers in the receiver array should be selected depending on the required data quality and resolution. Typically, an array of from 4 to 20 receivers has been found satisfactory.

The shots for which the data is to be analysed are selected to provide as wide a possible range of source-receiver azimuth. The shots are selected so that the minimum offset from the source array to the centre of the receiver array is several times greater than the wavelength of the Scholte waves. The maximum offset used is determined by the amplitude decay of the Scholte wave, and by the recording time. For example, a Scholte wave propagating at 2 Hz typically has a phase-velocity of around 300 m/s, resulting in a wavelength of around 150 m. A suitable minimum offset would be around 500 m, which is slightly over three times greater than the wavelength. In the case of a 10 s recording length, the maximum offset should be 3000 m. In order to avoid spatial aliasing, a maximum geophone separation of around 25 m is suitable, although this will depend on the minimum expected wavelength of the Scholte wave.

Once suitable shots have been selected, the phase-velocity of the Scholte wave is determined for each shot. In a preferred embodiment, this is done by calculating the local frequency-wavenumber spectrum ("fk-spectrum") for each shot. The peaks in the fk-spectrum correspond to the phase velocity of the Scholte wave. The local fk-spectrum will typically contain more than one peak, and different peaks can represent different Scholte wave modes or other signals. The velocity that is determined is a local measurement of the velocity in a region below the receiver used to acquire the shot.

The fk-spectrum may be determined by using, for example, the "MUSIC" (multiple signal classification) algorithm developed by H. Krim and M. Viberg in "Two Decades of Array Signalling Research", IEEE Signal Processing Magazine, July 1996 and by K. Iranpour and E. Muyzert in "Application of Parametric Methods to a Number Estimation in Seismic Data", submitted to Geophysical Prospecting. The "MUSIC" algorithm is a parametric method that makes it possible to estimate an fk-spectrum from a small number, typically 4 to 20, of equi-distance spaced receivers. The fk-spectrum is a local measure, since the dispersion is measured within the receiver array and is independent of the distance of the source. The phase velocity of the Scholte wave is given by the maxima in the fk-spectrum. At each frequency ω the maximum energy in the local fk-spectrum is picked manually or automatically. The phase-velocity c is calculated from the wavenumber k corresponding to maximum energy using c=ω/k. When more than one distinct peak is found in the fk-spectrum it is necessary to identify which peak is which mode. This can be done by comparing the phase-velocity estimated from the fk-spectrum with the data in a time domain representation.

In the case of a receiver array in which the receivers are disposed substantially along a straight line, and for a shot in which the source-receiver azimuth lies along the axis of the receiver array, the local phase-velocity is equal to the apparent phase-velocity obtained from the fk-spectrum. However, if the source-receiver azimuth of the shot makes an angle α with the axis of the receiver array, it is necessary to correct the apparent phase-velocity determined from the fk-spectrum to account for this. In this case, the true phase velocity of the Scholte wave is given by:

$$V_{true}(\omega,\alpha)=V_{fk}(\omega,\alpha)/\cos\alpha \quad (4)$$

where $V_{true}(\omega, \alpha)$ is the true phase-velocity of the Scholte wave, and $V_{fk}(\omega, \alpha)$ is the apparent phase velocity determined from the fk-spectrum.

Equation (1) above may be solved for the coefficients $A_0$, $A_1, \ldots A_4$ if the phase-velocity of the Scholte wave is known for at least five different azimuths at a particular frequency. In this case, Equation (1) may be solved to give the value of the coefficients $A_0 \ldots A_4$ at the particular frequency.

To solve equation (1) it may be re-written as the following matrix equation that is to be solved for the unknown coefficients $A_0 \ldots A_4$:

$$\begin{bmatrix} 1 & \cos2\varphi_1 & \sin2\varphi_1 & \cos4\varphi_1 & \sin4\varphi_1 \\ \vdots & \vdots & \vdots & \vdots & \vdots \\ 1 & \cos2\varphi_N & \sin2\varphi_N & \cos4\varphi_N & \cos4\varphi_N \end{bmatrix} \begin{bmatrix} A_0(\omega_j) \\ A_1(\omega_j) \\ A_2(\omega_j) \\ A_3(\omega_j) \\ A_4(\omega_j) \end{bmatrix} = \begin{bmatrix} V_1(\omega_j\varphi_1) - V_0(\omega_j\varphi_1) \\ \vdots \\ V_N(\omega_j\varphi_N) - V_0(\omega_j\varphi_N) \end{bmatrix} \quad (5)$$

In equation (5), $\phi_1 \ldots \phi_N$ represent the different azimuth angles, N must be 5 or greater, $\omega_j$ represents one particular frequency, and $V_1(\omega_j, \phi_1)$ represents the phase-velocity determined for the Scholte wave at frequency $\omega_j$ for a shot having a source-receiver azimuth $\phi_1$. As noted above with respect to equation (1), $V_0(\omega_j, \phi_1)$ is a reference phase-velocity calculated for frequency $\omega_j$ and source-receiver azimuth $\phi_1$ using a standard model. Details on how to derive a suitable reference model are given by E. Muyzert, in "Scholte wave inversion for a near surface S-velocity model and PS-statics" SEG Expanded Abstracts pp 1197-1200 (2000).

Equation (5) may be solved to give the values of the coefficients $A_0$ to $A_4$ at frequency $\omega_j$, provided that the phase-velocity at frequency $\omega_j$ is known for at least five different source-receiver azimuths. Equation (5) may be solved by any suitable method, for example a least-squares method.

Once the coefficients $A_i(\omega_j)$ are known, the polarisation angle at frequency $\omega_j$ may be determined using equation (2).

Once the coefficients $A_i$ have been determined for a frequency $\omega_j$, the process of solving equation (5) to determine the coefficients $A_i$ may be repeated at one or more different frequencies. This provides the values of each coefficient $A_i$ at two or more different frequencies. Furthermore, the polarisation angle may be determined from equation (2) at each frequency for which the value of the coefficients $A_i(\omega)$ is known.

Alternatively, Equation (5) may be solved just for the coefficients $A_0$, $A_1$ and $A_2$ since the other coefficients are not required for the calculation of the polarisation angle. This is an approximation, but requires measurements at only three or more different azimuths (that is, $N \geq 3$ instead of $N \geq 5$). Equation (5) may be solved just for the terms $A_0$, $A_1$ and $A_2$ using:

$$\begin{bmatrix} 1 & \cos2\varphi_1 & \sin2\varphi_1 \\ \vdots & \vdots & \vdots \\ 1 & \cos2\varphi_N & \sin2\varphi_N \end{bmatrix} \begin{bmatrix} A_0(\omega) \\ A_1(\omega) \\ A_2(\omega) \end{bmatrix} = \begin{bmatrix} V_1(\omega, \varphi_1) - V_0(\omega, \varphi_1) \\ \vdots \\ V_N(\omega, \varphi_N) - V_0(\omega, \varphi_N) \end{bmatrix} \quad (6)$$

The static shift of the near surface 5 may be estimated by determining the frequency-average value of the polarisation angle, using:

$$\varphi_{fast}(\text{average}) = \frac{1}{M} \sum_{j=1}^{M} \varphi_{fast}(\omega_j) \quad (7)$$

In equation (7), the average polarisation angle is determined from the values of the polarisation angle for M different values of the frequency ($\omega_j$). Alternatively rather than averaging the polarisation angles obtained at different frequencies, the polarisation angle $\phi_{fast}$ corresponding to a frequency that samples the near surface well, such as the lowest available frequency, could be used.

The average polarisation angle obtained using equation (7), or the polarisation angle $\phi_{fast}$ corresponding to a frequency that samples the near surface well, may be used to remove the effects of the anisotropy of the near surface 5 from ps-converted wave data This may be done by "rotating" the acquired data such that one horizontal component is coincident with the polarisation angle. The "rotation" is done using an equation similar to equation (5) above, but with φ in equation (5) replaced by $\phi_{fast}$ or $\phi_{fast}$ (average).

This process is illustrated schematically in FIGS. 7(a) and 7(b). FIG. 7(a) shows the orientation of the two horizontal internal axes of the receiver, which are assumed to be the receiver's x- and y-axis, and their relation to the frequency-averaged polarisation angle. It is assumed that there is an angle β between the receiver's x-axis and the average polarisation angle.

In FIG. 7(b) new axes have been defined for the receiver. These are shown as the x'- and y'-axes. The x'-axis is at an angle β to the original x-axis of FIG. 7(a), and so is coincident with the polarisation angle. As a result, the x'-component of the receiver data now contains the fast ps-wave, and the y' component of the seismic data acquired at the receiver contains the slow ps-wave.

The process of rotating the receiver axes is a virtual rotation process. The x- and y-components of the seismic data acquired at the receiver are processed to produce the data that would have been acquired if the receiver axes had been aligned along the x'- and y'-directions of FIG. 7(b).

Once the horizontal components of the seismic data have been rotated so that one component is coincident with the polarisation angle, the static shift may then be determined for both the x'-component of the seismic data (that is, for the fast ps-wave data) and for the y' component of the data (that is for the slow ps-wave data). This may be done using any conventional technique for determining the static shift.

Once the static shift has been determined for both the fast and slow ps-waves, the arrival time of the slow s-wave may be shifted by the difference between the static shift determined for the fast ps-wave and the static shift determined for the slow ps-wave. The x'- and y'-components of the seismic data may now be rotated back by an angle -β, to return to the original x- and y-axes. The effect of the azimuthal anisotropy of the low velocity layer has now been removed from the ps-wave data, since the difference in static shift between the fast ps-wave data and the slow ps-wave data has been eliminated.

Figure 6:
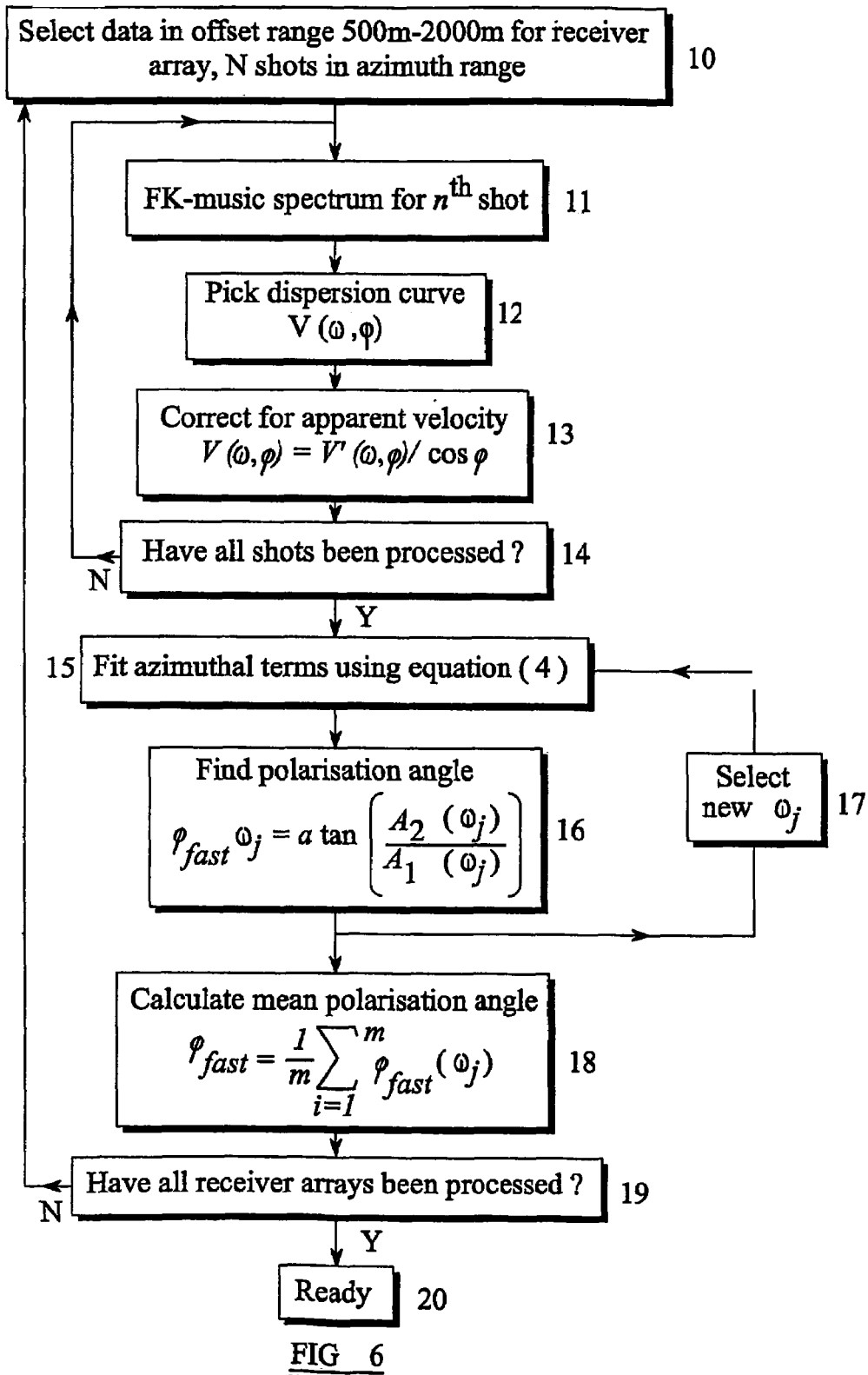
FIG. 6 is a block flow diagram illustrating a method according to one embodiment of the present invention.

FIG. 6 is a block flow diagram showing the principal steps of a method of determining the polarisation angle using the present invention.

At step 10, seismic data having a suitable offset range are selected. The seismic data relate to N shots, each shot having a source-receiver azimuth within a desired range.

The present invention may be applied to pre-existing seismic data, in which case step 10 may optionally be preceded by the step (not shown) of retrieving seismic data from storage. Alternatively, the present invention may be performed on seismic data that have been specifically obtained for this purpose, in which case step 10 may be preceded by the step (not shown) of acquiring seismic data.

At step 11 the local frequency-wavenumber spectrum (fk spectrum) for the $n^{th}$ shot is determined for the receiver array. This may be done, for example, using the "MUSIC" algorithm.

At step 12 the apparent phase-velocity of the interface wave, in this embodiment a Scholte wave, is determined from the fk spectrum, as corresponding to the peak value in the fk spectrum. It might be possible to determine the apparent phase velocity for two or mode modes of the interface wave in this step, if the fk-spectrum has two or more maxima.

If the $n^{th}$ shot has a source-receiver azimuth that is not aligned with the axis of the receiver array, the apparent phase-velocity is corrected for this at step 13, using equation (2). If the source-receiver azimuth of the $n^{th}$ shot is aligned with the axis of the receiver array, the apparent phase-velocity obtained in step 12 will not change as a result of the correction in step 13.

At step 14 a determination is made as to whether all the N shots selected at step 10 have been processed according to steps 11, 12 and 13. If step 14 yields a "no" determination, another shot is selected and steps 11 to 14 are repeated for the new shot. Steps 11 to 14 are repeated until a "yes" determination is obtained at step 14.

At step 15 the coefficients $A_i(\omega)$ in equation (1), or at least the coefficients $A_0$, $A_1$ and $A_2$, are determined. This may be done by solving equation (5), or by solving the reduced equation (6). The result of step 15 is, if equation (5) is used, the value of the coefficients $A_i$ at a particular frequency $\omega_j$ or, if equation (6) is used, the values of $A_0$, $A_1$ and $A_2$ at a particular frequency $\omega_j$.

At step 16 the polarisation angle at frequency $\omega_j$ is determined using equation (2) and the values of $A_1(\omega_j)$ and $A_2(\omega_j)$ determined at step 15.

At step 17 a different frequency is selected, and steps 15 and 16 are then repeated for the new frequency. Steps 17, 15 and 16 may be repeated for further frequencies.

At step 18 the mean polarisation angle is determined using equation (5).

Once step 18 has been carried out the average polarisation angle is known for the receiver array and it is possible to determine the static shift and remove anisotropy from the data acquired by that receiver array. In practice, however, it is more efficient to determine the average polarisation angle for all receiver arrays before determining the static shifts and removing the anisotropy from the data. In the embodiment of FIG. 6, therefore, at step 19 a determination is made as to whether all receiver arrays have been processed. If step 19 yields a "no" determination, steps 10 to 18 are repeated for another receiver array. Steps 10 to 18 are repeated until a "yes" determination is obtained at step 19.

Once a "yes" determination is achieved at step 19, it is now possible to use the average polarisation angle to remove the effect of anisotropy of the near surface from the seismic data, as described above.

Figure 2:
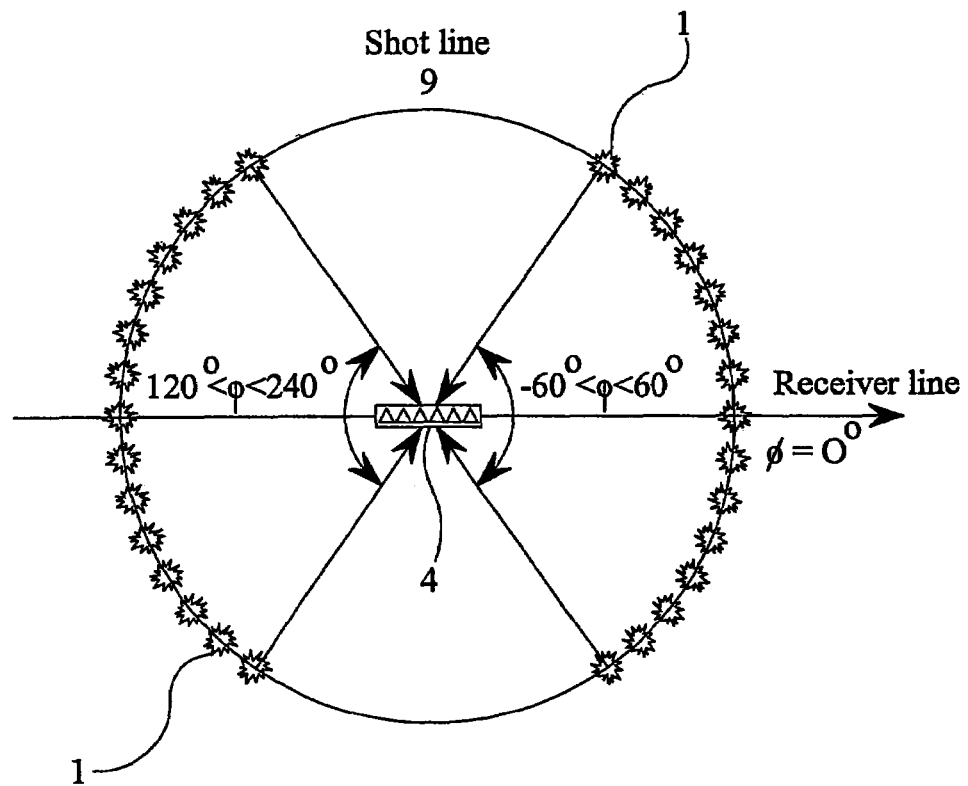
FIG. 2 is a plan view of a seismic surveying arrangement suitable for use with the present invention.

FIG. 2 illustrates one possible survey geometry suitable for acquiring seismic data that can be processed according to a method of the present invention. In the survey geometry of FIG. 2 the receivers 4 are represented by solid triangles, and the sources 1 are represented by stars.

In the survey geometry of FIG. 2 the receivers 4 are arranged in a linear array. Six receivers are shown in FIG. 2, but the survey geometry is not limited to a receiver array having exactly six receivers. The number of receivers may be selected to ensure that the quality and resolution of the data are satisfactory. In practice, between 4 and 20 receivers are generally found to give satisfactory results.

In the survey geometry of FIG. 2 the sources are located generally on the diameter of a circle that is centred on the centre of the receiver array. 34 sources 1 are shown in FIG. 2, but the survey geometry is not limited to this exact number of sources. All the source-receiver pairs have approximately the same offset, and this is approximately equal to the radius of the circle on which the sources one are arranged. As explained above, the offset should be at least a few times the expected wavelength of the Scholte wave, and the maximum offset is determined by the amplitude decay of the Scholte wave and by the time period in which data is recorded after a source has been actuated.

In operation, each source is actuated in turn. When a source is actuated data will be acquired at each receiver 4 in the receiver array, and the apparent phase-velocity of the Scholte wave is determined from the seismic data as described above. The apparent velocity is then corrected to take account of the angle between the source-receiver azimuth and the axis of the receiver array.

In principle, the sources can be disposed around the circumference of the circular shot line 9. In practice, however, if the angle $\alpha$ between the source-receiver azimuth and the shot line has a magnitude that is greater than around 60°, the apparent phase-velocity is so high that the true phase velocity obtained using equation (2) becomes less reliable. It is therefore preferable if the sources 1 are disposed such that the angle between the source-receiver azimuth and the axis of the receiver array does not significantly exceed 60°. This has been achieved in FIG. 2 by arranging the sources 1 so that they have an azimuth in the range $-60°\leq\phi\leq60°$ or $120°\leq\phi\leq240°$. (In FIG. 2 the receiver axis is coincident with the $\phi=0$ axis, so that the source-receiver azimuth of a shot is, neglecting the finite extent of the receiver array, equal to the azimuth of the receiver.)

Figure 3:
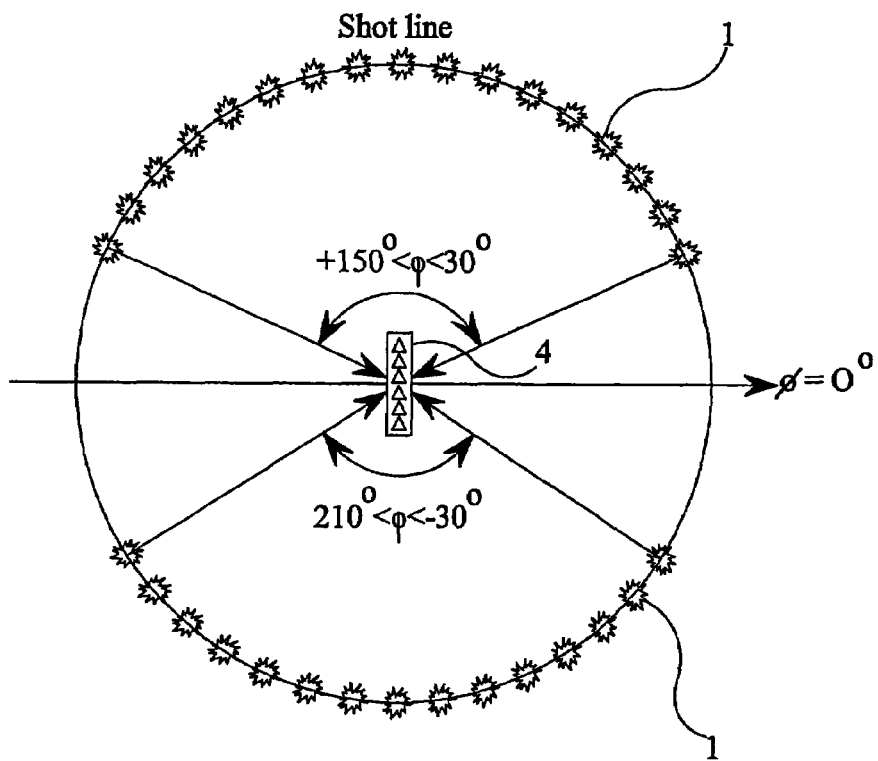
FIG. 3 is a plan view of a further seismic surveying arrangement suitable for use with the present invention.

The seismic surveying arrangement shown in FIG. 2 will produce seismic data having two gaps in its azimuthal coverage, since there will be no data for azimuthal angles between 60° and 120° or between 240° and 300°. To overcome this, it is possible to combine the seismic data acquired in the seismic surveying arrangement of FIG. 2 with seismic data acquired in a complimentary seismic surveying arrangement shown in FIG. 3. This again contains a linear array of seismic receivers 4, but the axis of the receiver array is aligned along the azimuth $\phi=90°$. The seismic sources are again arranged on the circumference of a circle that is centred on the centre of the receiver array. The sources are again disposed such that the angle $\alpha$ between the source-receiver azimuth and the axis of the receiver array does not exceed 60°. This is achieved by disposing the sources 1 in the azimuth range $30°\leq\phi\leq15020$ and $210°\leq\phi\leq-30°$. As in the seismic surveying arrangement of FIG. 2, the seismic surveying arrangement of FIG. 3 is used to acquire data by actuating each source 1 in turn. When a source 1 is actuated it emits seismic energy and this is recorded by the receivers 4 of the receiver array, and the phase-velocity of the Scholte wave is determined as described above.

It will be noted that the seismic surveying arrangement of FIG. 2 provides information on the phase velocity of Scholte waves for azimuths in the range $-60°\leq\phi\leq60°$ and $120°\leq\phi\leq240°$, whereas the seismic surveying arrangement of FIG. 3 provides information about the phase-velocity of Scholte waves in the azimuth ranges $30°\leq\phi\leq150°$ and $210°\leq\phi\leq-30°$. Thus, the two seismic surveying arrangements together provide coverage of the entire azimuthal range. Furthermore, the azimuthal coverage of the seismic surveying arrangement of FIG. 2 overlaps with the azimuthal coverage of the seismic surveying arrangement of FIG. 3, for example in the range $30°\leq\phi\leq60°$. These regions of overlapping azimuthal coverage may be used to determine that the results of the two seismic surveying arrangements are consistent with one another, and also to provide an estimate of the errors in the measurement of the phase velocity.

It would in practice be possible to embody the seismic surveying arrangements of FIGS. 2 and 3 in a single seismic survey in which receivers were disposed around a circular shot line 9 so as give complete azimuthal coverage. For example, a source one could be disposed every 10° around a circular shot line 9. The seismic surveying arrangement would have receivers that provided both a linear receiver array along the $\phi=0°$ line and could also provide a linear receiver array along the line $\phi=90°$. This could be achieved by having receivers arranged in a cross-shaped receiver array, with the centre of the cross being substantially coincident with the centre of the circular shot line 9. Alternatively, the receivers could be arranged in a grid—a 6×6 grid of receivers would provide the receiver array of FIG. 2 and the receiver array of FIG. 3. Such a grid may conveniently be embodied by neighbouring OBC sensor arrays that are disposed parallel to one another and close to one another (for example with a 25 m separation between adjacent OBC arrays). When a particular seismic source is actuated, seismic data acquired by the appropriate receivers is selected for analysis, so that the seismic surveying arrangement of FIG. 2 or FIG. 3 may be reproduced.

Figure 4:
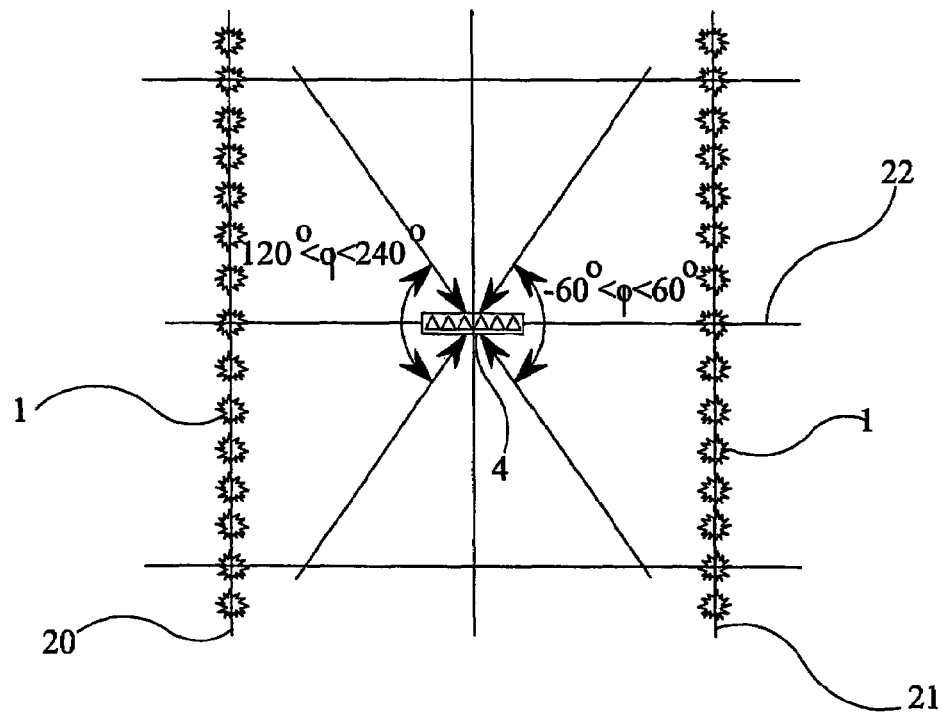
FIG. 4 is a plan view of a further seismic surveying arrangement suitable for use with the present invention.

FIG. 4 shows a further seismic surveying arrangement that may be used to provide seismic data that can be processed by the method of the present invention. This is the well-known "cross-spread" geometry, which comprises two shot lines 20, 21 which are parallel to one another, and which are perpendicular to a receiver line 22. The spacing between adjacent sources 1 on a shot line 20, 21 is small, for example around 25 m. The spacing between a shot line 20, 21 and the receiver array is large, and may typically be several hundreds of meters, for example 600 m. As in the seismic surveying arrangements of FIGS. 2 and 3, it is preferable that the angle between the source-receiver azimuth and the axis of the receiver array does not significantly exceed 60°, to ensure reliable results are obtained. This may be achieved by choosing the length of the shot lines and their separation from the receiver array appropriately.

Unlike the seismic surveying arrangement of FIGS. 2 and 3, the offset of the source-receiver pairs is not constant in the seismic surveying arrangement of FIG. 4. The length of the shot lines 20, 21 and their separation from the receiver array is preferably selected to keep the offset between the minimum offset and maximum offset described above.

The seismic surveying arrangement of FIG. 4 again has gaps in azimuthal coverage, since there is no coverage for azimuths between 60° and 120°, or for azimuths between 240° and −60°. In principle, these gaps in the azimuthal coverage could be overcome by using a complementary cross-spread surveying arrangement in which the receiver array was aligned vertically and the source arrays were aligned horizontally.

Figure 5:
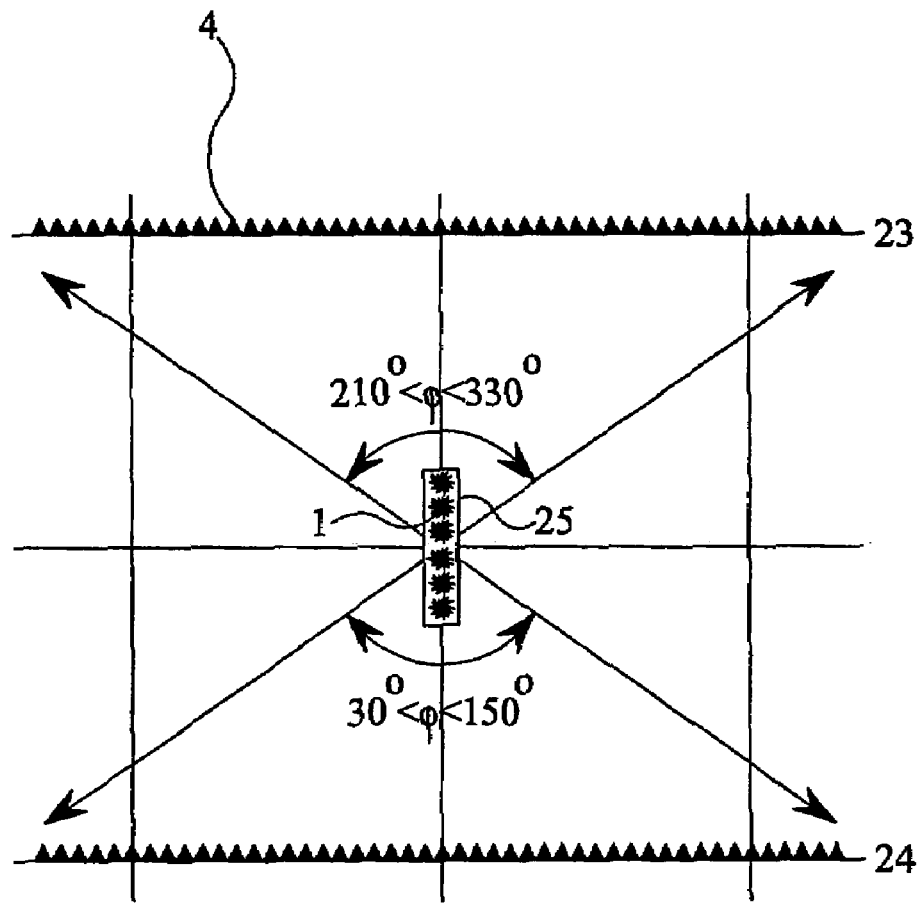
FIG. 5 is a plan view of a further seismic surveying arrangement suitable for use with the present invention.

FIG. 5 illustrates an alternative seismic surveying arrangement that can be used to fill in the gaps in the azimuthal coverage of the seismic surveying arrangement of FIG. 4. This makes use of the principle of reciprocity, which states that the results of a seismic survey are unaffected if the positions of the sources and the positions of the receivers are interchanged.

Thus, the seismic surveying arrangement shown in FIG. 5 contains a linear array of sources one, and two parallel linear arrays of receivers 4. The receiver arrays 23, 24 are parallel to one another and are perpendicular to the axis of the source array 25. The centre of the source array 25 is approximately midway between one receiver array 23 and the other receiver array. The phase velocity of the Scholte wave is measured over the source array, so that the local phase-velocity of the Scholte wave at a point in the near-surface 5 underneath the sources 1 is obtained. This approach assumes that the Scholte wave conversion point is close to the position of the source array, and that there are no significant variations in the conversion of p-waves to Scholte waves within the area underneath the source array.

As is the case for other seismic surveying arrangements, the seismic data produced by the seismic surveying arrangement of FIG. 5 will enable the apparent phase-velocity of the Scholte waves to be determined. In order to obtain the true phase-velocity of the Scholte wave it is necessary to correct for the angle between the source-receiver azimuth and the axis of the source array, by using equation (2).

When a seismic surveying array according to FIG. 4 and a seismic surveying array according to FIG. 5 are used, centred on the same point, the local phase-velocity of Scholte waves is sampled at the same location but at different azimuths.

The method of the invention has been described above with respect to marine seismic data, and with respect to using Scholte waves to determine the statics of the near surface 5. The invention is not, however, limited to use with marine seismic data. It may be applied to seismic data acquired in a conventional land-based seismic survey, or to borehole seismic data acquired in a seismic survey in which the sources or receivers are located in a borehole. In the case of a land-based seismic survey interface waves, namely Love waves or Rayleigh waves, are generated in and propagate through the near surface, and these interface waves may be used to determine information about the properties of the near surface. In the case of a borehole-based seismic survey interface waves, namely Stonely waves, are again generated in and propagate through the near surface, and the method of the invention may be applied to these interface waves.

FIG. 8 is a schematic block diagram of an apparatus 26 according to the present invention. The apparatus is able to carry out a method according to the present invention.

The apparatus 26 comprises a programmable data processor 27 with a program memory 28, for instance in the form of a read only memory ROM, storing a program for controlling the data processor 27 to process seismic data by a method of the invention. The system further comprises non-volatile read/write memory 29 for storing, for example, any data which must be retained in the absence of power supply. A "working" or "scratchpad" memory for the data processor is provided by a random access memory (RAM) 30. An input device 31 is provided, for instance for receiving user commands and data. An output device 32 is provided, for instance for displaying information relating to the progress and result of the method. The output device may be, for example, a printer, a visual display unit or an output memory.

Seismic data for processing may be supplied via the input device 31 or may optionally be provided by a machine-readable store 33.

The program for operating the system and for performing the method described hereinbefore is stored in the program memory 28, which may be embodied as a semi-conductor memory, for instance of the well-known ROM type. However, the program may be stored in any other suitable storage medium, such as magnetic data carrier 28a (such as a "floppy disc") or CD-ROM 28b.

The invention claimed is:

1. A method of processing seismic data, the method comprising the steps of: placing a receiver array at a surface above a basement, selecting events arising from interface seismic waves in at least two shots, the two shots having different source-receiver azimuths from one another; obtaining information about azimuthal dependence of the velocity of seismic energy at a location in the near-surface of the earth's interior and below the receiver array by processing only the selected events arising from interface seismic waves to determine the direction of anisotropy in a layer between the basement and the surface, and further the step of determining the azimuth $\phi_{fast}$ of a fast interface wave at at least two different frequencies to derive a correction for static phase shift for the seismic data.

2. A method as claimed in claim 1 wherein the seismic data are marine seismic data and the selected events are events arising from Scholte waves.

3. A method as claimed in claim 1 wherein the seismic data are land seismic data and the selected events are events arising from Love waves or Rayleigh waves.

4. A method as claimed in claim 1 further comprising the step of determining the local phase velocity of the interface wave for each shot.

5. A method as claimed in claim 1 and comprising the step of determining the local phase velocity of the interface wave at a point in the near-surface located generally below a receiver.

6. A method as claimed in claim 4 wherein the step of determining the phase velocity of the interface wave in the surface layer for each shot comprises determining the local frequency-wavenumber spectrum (fk spectrum) for each shot.

7. A method as claimed in claim 5 and further comprising the step of correcting the phase velocity in the near-surface of the interface wave determined for a shot for the source-receiver azimuth of the shot.

8. A method as claimed in claim 7 wherein the seismic data are seismic data acquired using a substantially linear receiver array, and the step of correcting for the source-receiver azimuth of a shot comprises determining:

$$V_{corr}(\omega,\alpha) = V(\omega,\alpha)/\cos\alpha$$

where $\alpha$ is the angle between the source-receiver azimuth of the shot and the line of the receiver array and $V(\omega,\alpha)$ is an apparent phase velocity and $V_{coor}(\omega,\alpha)$ is a corrected phase velocity.

9. A method as claimed in claim 1 and comprising determining the phase velocity of the interface wave at a first frequency in the near-surface for at least five different source-receiver azimuths; and determining the value of at least the coefficients $A_0$ to $A_2$ at the first frequency using $$V(\omega,\phi) - V_0(\omega,\phi) = A_0(\omega) + A_1(\omega)\cos(2\phi) + A_2(\omega)\sin(2\phi) + A_3(\omega)\cos(4\phi) + A_4(\omega)\sin(4\phi)$$

where $V(\omega,\phi)$ is the phase-velocity of the interface wave at a frequency $\omega$ and an azimuth $\phi$, $V_0(\omega,\phi)$ is a reference phase-velocity of the interface wave, and $A_0(\omega)$ is the variation in the isotropic phase-velocity.

10. A method as claimed in claim 1 and further comprising the step of determining the azimuth $\phi_{fast}$ of a fast interface wave at the first frequency using $$\varphi_{fast} = \arctan\left(\frac{A_2}{A_1}\right). \tag{2}$$

11. A method as claimed in claim 1 and comprising the step of determining the average value of the azimuth $\phi_{fast}$ of the fast interface wave at at least the first and second frequencies.

12. A method of seismic surveying comprising the steps of: acquiring first seismic data at a survey location; and processing the first seismic data according to a method defined in claim 1 thereby to obtain information about the properties of the near-surface at the survey location.

13. A method of seismic surveying as claimed in claim 12 and further comprising processing the first seismic data to obtain information about at least one underlying layer.

14. A method of seismic surveying as claimed in claim 12 and further comprising the steps of: acquiring second seismic data at the survey location; and processing the second seismic data to obtain information about at least one underlying layer at the survey location.

15. An apparatus for processing seismic data, the apparatus comprising:

means for selecting events arising from interface seismic waves in at least two shots and recording by a receiver array at a surface above a basement, the two shots having different source-receiver azimuths from one another; and means for obtaining information about azimuthal dependence of the phase velocity of seismic energy at a location in the near-surface of the earth's interior and below a receiver by processing only the selected events arising from interface seismic waves to determine the direction of anisotropy in a layer between the basement and the surface, and for determining the azimuth $\phi_{fast}$ of a fast interface wave at at least two different frequencies to derive a correction for static phase shift for the seismic data.

16. An apparatus as claimed in claim 15 and further comprising means for determining the local phase velocity of the interface wave in the near-surface for each shot.

17. An apparatus as claimed in claim 16 wherein the means for determining the local phase velocity of the interface wave in the near-surface for each shot comprises means for determining the frequency-wavenumber spectrum (fk spectrum) for each shot.

18. An apparatus as claimed in claim 16 and further comprising means for correcting the phase velocity of the interface wave in the near-surface determined for a shot for the source-receiver azimuth of the shot.

19. An apparatus as claimed in claim 18 wherein the means for correcting the phase velocity of the interface wave are adapted to determine $$V_{corr}(\omega,\phi) = V(\omega,\phi)/\cos\alpha$$

where α is the angle between the source-receiver azimuth of the shot and the line of a substantially linear receiver array and $V(\omega,\phi)$ is an apparent phase velocity and $V_{coor}(\omega,\phi)$ is a corrected phase velocity.

20. An apparatus as claimed in claim 15 and comprising means for determining the phase velocity of the interface wave at a first frequency in the near-surface layer for at least five different source-receiver azimuths; and determining the values of at least the coefficients $A_0$ to $A_2$ at the first frequency using $$V(\omega,\phi) - V_o(\omega,\phi) = A_0(\omega) + A_1(\omega)\cos(2\phi) + A_2(\omega)\sin(2\phi) + A_3(\omega)\cos(4\phi) + A_4(\omega)\sin(4\phi)$$

where $V(\omega,\phi)$ is the phase-velocity of the interface wave at a frequency $\omega$ and an azimuth $\phi$, $V_0(\omega,\phi)$ is a reference phase-velocity of the interface wave, and $A_0(\omega)$ is the variation in the isotropic phase-velocity.

21. An apparatus as claimed in claim 20 and further comprising means for determining the azimuth $\phi_{fast}$ of a fast interface wave at the first frequency using $$\varphi_{fast} = \arctan\left(\frac{A_2}{A_1}\right). \tag{2}$$

22. An apparatus as claimed in claim 15 and comprising means for determining the average value of the azimuth $\phi_{fast}$ of the fast interface wave at at least the first and second frequencies.

23. An apparatus as claimed in claim 15 and comprising a programmable data processor.

* * * * *